United States Patent
Yamaguchi et al.

(10) Patent No.: US 6,567,149 B1
(45) Date of Patent: *May 20, 2003

(54) REFLECTION LIQUID CRYSTAL DISPLAY DEVICE

(75) Inventors: Hisanori Yamaguchi, Ishikawa-gun (JP); Tomoaki Sekime, Kanazawa (JP); Yoshio Iwai, Kanazawa (JP); Tetsu Ogawa, Kanazawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/673,310

(22) PCT Filed: Apr. 9, 1999

(86) PCT No.: PCT/JP99/01890
§ 371 (c)(1),
(2), (4) Date: Nov. 29, 2000

(87) PCT Pub. No.: WO99/54781
PCT Pub. Date: Oct. 28, 1999

(30) Foreign Application Priority Data

Apr. 17, 1999 (JP) ............................................ 10-108191

(51) Int. Cl.$^7$ ................................................ C09K 19/02
(52) U.S. Cl. ...................................... 349/181; 349/180
(58) Field of Search .................................. 349/180, 181

(56) References Cited

U.S. PATENT DOCUMENTS 5,734,455 A   3/1998   Yoshida et al. ............... 349/99
6,281,956 B1 * 8/2001   Ohmuro et al. ............. 349/118
6,297,863 B1 * 10/2001  Yamaguchi et al. ........ 349/112

FOREIGN PATENT DOCUMENTS

| EP | 0 470 817 A2 | 2/1992 |
| JP | 6-175125 | 6/1994 |
| JP | 6-301006 | 10/1994 |
| JP | 6-308481 | 11/1994 |
| JP | 7-84252 | 3/1995 |
| JP | 7-146469 | 6/1995 |
| JP | 10-39296 | 2/1998 |

* cited by examiner

Primary Examiner—Robert H. Kim
Assistant Examiner—Jeanne A. DiGrazio
(74) Attorney, Agent, or Firm—Parkhurst & Wendel, L.L.P.

(57) ABSTRACT

A reflection liquid crystal display device comprising only one polarization film, wherein the twist angle of a nematic liquid crystal ranges from 0° to 90°, the relationship between the difference between the indices of birefringence $\Delta n_{LC}$, the thickness of the liquid crystal layer $d_{LC}$, and the retardation of the phase plate $R_F$ is expressed by $\Delta n_{LC} \cdot d_{LC} = 0.20$ to $0.30$ $\mu$m, $R_F - \Delta n_{LC} \cdot d_{LC} = -0.20$ to $-0.05$ $\mu$m; Defining the direction in which a nematic liquid crystal is twisted toward a lower substrate when viewed from above an upper substrate as positive and letting the direction of the major axis of the liquid crystal molecule the nearest to one of the upper and lower substrates be represented by $\Phi_{LC}$, the direction of the phase lagging axis of the phase plate be represented $\Phi_F$, and the direction of the absorbing or transmitting axis of the polarization film be represented by $\Phi_P$, the relationship between the directions is expressed by $\Phi_F - \Phi_{LC} = -40°$ to $-25°$, $\Phi_P - \Phi_F = +50°$ to $+80°$ or $\Phi_F - \Phi_{LC} = +65°$ to $105°$, $\Phi_P - \Phi_F = -60°$ to $-90°$. Therefore, bright white can be displayed and a nonchromatic high-contrast image can be also displayed.

18 Claims, 5 Drawing Sheets

FIG. 8

REFLECTION LIQUID CRYSTAL DISPLAY DEVICE

TECHNICAL FIELD OF THE INVENTION

The present invention relates to reflective liquid crystal display devices.

BACKGROUND OF THE TECHNOLOGY

As liquid crystal display devices are thin and light, they are used in a wide variety of applications including displays for portable information terminals. Liquid crystal display devices are passive devices that do not emit light but display information by changing intensity of light transmission. As they can be driven with a root-mean-square voltage of several volts, when used as a reflective type by installing a reflector underneath a liquid crystal display device so as to make use of the ambient light, back-light power is made unnecessary thus providing a display device with extremely low power dissipation.

Existing reflective color liquid crystal display devices comprise a liquid crystal cell with a color filter and a pair of polarization films disposed in a manner such that they sandwich the liquid crystal cell. The color filter is provided on one of the substrates of the liquid crystal cell, and a transparent electrode is formed on top of the color filter. Color display is effected by controlling light transmissivity of each of the color filter elements by changing the alignment of liquid crystal molecules through application of a voltage to the liquid crystal cell.

Light transmissivity of a polarization film is at most about 45% and the light transmissivity of polarized light in parallel to the axis of absorption of the polarization film is almost 0%, while that of polarized light perpendicular to the absorption axis is about 90%. Consequently, in a reflective liquid crystal display device using two polarization films, the maximum reflectivity neglecting absorption by the color filter and other components is calculated to be:

$$(0.9)^{4 \times 50}\% = 32.8\%$$

as the light is reflected out after passing the polarization films four times. Thus, even the reflectivity of a black-and-white display panel which does not use a color filter is at most about 33%. Incorporation of a color filter reduces the reflectivity to about ⅓ of this value.

Accordingly, in an effort to obtain a brighter display, a few proposals have been made on a configuration in which the liquid crystal cell is sandwiched between a polarization film and a reflecting plate as in, for example, Japanese Laid-Open Patent Applications No. Hei 7-146469 and Hei 7-84252. In this configuration, as the light passes the polarization film only twice, the maximum reflectivity neglecting absorption by the color filter and other components is calculated to be:

$$(0.9)^{2 \times 50}\% = 40.5\%,$$

which is about a 23% improvement at the maximum over a configuration using two polarization films.

However, in a liquid crystal cell which uses one polarization film, color distortion tends to occur when trying to make color display using a color filter as well as to securing brightness by increasing reflectivity, thereby presenting a difficulty in making achromatic display of black and white, especially difficulty in displaying low-reflectivity, achromatic black.

There have also been proposed a reflective color liquid crystal display apparatus (Japanese Laid-Open Patent Application No. Hei 6-308481) in which multicolor display is effected by using birefringence of twisted nematic liquid crystal layer and a polarization film without using a color filter, or a color liquid crystal display apparatus (Japanese Laid-Open Patent Application No. Hei 6-175125 and Japanese Laid-Open Patent Application No. Hei 6-301006) which makes use of the birefringence of the liquid crystal layer and phase difference film. As these apparatuses do not use a color filter, a reflectivity value enough to obtain practically acceptable brightness can be secured even when two polarization films are used. However, as the color display uses coloring based on birefringence, it has been difficult, by principle, to realize multi-shade, multi-color displays such as displays of 16 shades of 4096 colors or full-color displays with 64 shades. They also suffered narrow ranges of color purity and color reproduction.

In view of these circumstances, it is an object of the present invention to provide a reflective liquid crystal display device which gives bright display of white and a high contrast, and which is capable of displaying achromatic black as well as multi-color, multi-shade displaying.

DISCLOSURE OF THE INVENTION

The reflective liquid crystal display device according to the present invention includes a liquid crystal cell made by sealing nematic liquid crystals between a pair of substrates, a polarization film disposed on one of the substrates of the liquid crystal cell, a phase plate disposed between the polarization film and the liquid crystal cell, and an optical reflection means disposed on the other substrate, where the twist angle of the nematic crystals between the pair of substrates is in the range 0° to 90°, the product $\Delta n_{LC} \cdot d_{LC}$ of the index of birefringence $\Delta n_{LC}$ of the nematic liquid crystals and the thickness $d_{LC}$ of the liquid crystal layer is in the range 0.20 to 0.30 micrometer, the difference in the indices of birefringence $\Delta R$ as defined, using the product $\Delta n_{LC} \cdot d_{LC}$ and retardation $R_F$ of the phase plate, by $R_F - \Delta n_{LC} \cdot d_{LC}$ is in the range −0.20 micrometer to −0.05 micrometer, defining the direction in which nematic liquid crystals are twisted from one of the substrates toward the other substrate when viewed from one of the substrates is positive in angle, the direction of the major axis of liquid crystal molecules closest to one of the substrates as $\Phi_{LC}$, the direction of the slow axis of the phase plate by $\Phi_P$, the direction of the absorption axis or the transmission axis of the polarization film by $\Phi_P$, the present invention is featured by either of the following relations, that is, $\Phi_F - \Phi_{LC}$ is in the range −40° to −25° and $\Phi_P - \Phi_F$ is in the range +50° to +80°, or $\Phi_F - \Phi_{LC}$ is in the range +65° to +105° and $\Phi_P - \Phi_F$ is in the range −60° to −90°.

Here, as taking of $\Phi_P$ in the direction of the absorption axis of the polarization film is optically equal to taking it in the direction of the transmission axis, either direction is acceptable.

Also, in the reflective liquid crystal display device in accordance with the present invention, it is preferable that the twist angle of nematic liquid crystals is in the range 30° to 65° and $R_F$ is in the range 0.10 micrometer to 0.30 micrometer. These preferred examples will provide further improved characteristics.

With this configuration, a normally white reflective liquid crystal display device which is capable of displaying bright image with achromatic black and white, and multiple colors in multiple shades.

BRIEF DESCRIPTION OF THE DRAWINGS

FIG. 6 is an example of reflectivity of black as a function of the polar angle in the rightward direction (a) and upward direction (b) with an on-voltage applied.

DESCRIPTION OF THE PREFERRED EMBODIMENTS

Referring to the drawings, a description will be given below on exemplary embodiments of the present invention.

First Exemplary Embodiment

Figure 1:
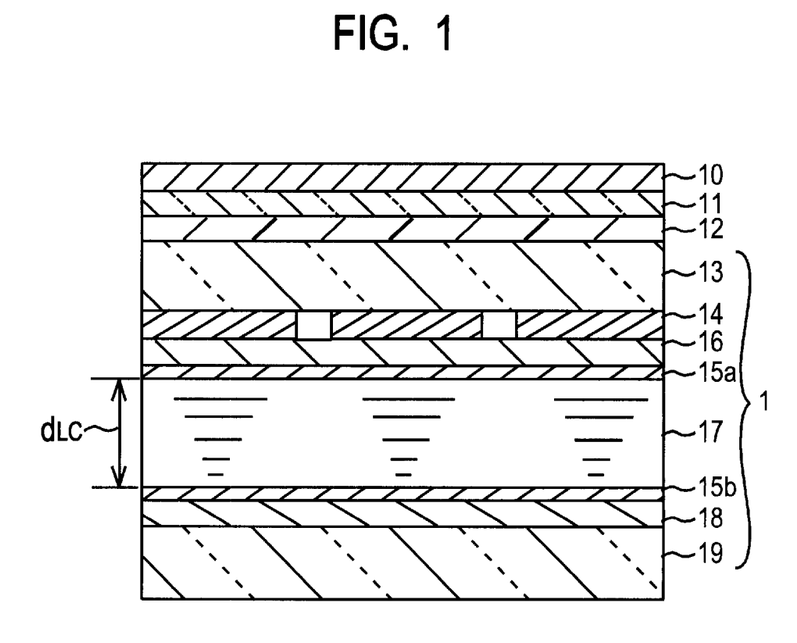
FIG. 1 is a cross-sectional view of the schematic structure of a reflective liquid crystal display device in a first exemplary embodiment of the present invention.

FIG. 1 is a cross-sectional view of the schematic structure of a reflective liquid crystal display device in the first exemplary embodiment. A description will be given below on the method of its fabrication.

First, using non-alkaline glass substrates (for example, 1737 by Corning, Inc.) as an upper transparent substrate 13 and a lower substrate 19, a color filter layer 14 was formed on the upper transparent substrate 13 by photolithography in the form of red, green, and blue stripes of dispersed pigments, and on top of which indium tin oxide pixel electrode was formed as a transparent electrode 16. Also, a specular reflection type metal reflection electrode 18 was formed on the lower substrate 19 by first evaporating 300 nm of titanium followed by evaporating 200 nm of aluminum on top of it.

The transparent electrode 16 and the metal reflection electrode 18 were printed with a 5% by weight solution of polyimide in gamma-butyrolactone. After curing at 250° C., alignment layers 15a and 15b were formed through aligning process by rotary rubbing method using rayon cloth so that a predetermined twist angle could be obtained.

Subsequently, thermosetting sealing resin (for example: STRUCTOBOND® by Mitsui Toatsu Chemical) prepared by mixing 1.0% by weight of glass fibers of predetermined radius was printed on the periphery of the upper transparent substrate 13, resin beads of predetermined radius were sprinkled on the lower substrate 19 to a density of 100–200 pieces/mm². The upper transparent substrate 13 and the lower substrate 19 were then put together, the sealing resin was cured at 150° C., and liquid crystal prepared by mixing chiral liquid crystal into nematic liquid crystal of the fluorine ester group with a birefringence value $\Delta n_{LC}$ of 0.09 to obtain chiral pitch of 80 micrometer was vacuum injected. The assembly was then sealed with ultraviolet setting resin and cured with ultraviolet light. The thickness of the liquid crystal layer is represented by $d_{LC}$.

On top of the upper transparent substrate 13 of a liquid crystal cell 1 thus formed, an isotropic front scattering film was pasted as a scattering film layer 12, on top of which a polymer film of polycarbonate was then pasted as a phase plate 11 in a manner such that the slow axis would make an angle to be described later. Further on top of it, a neutral gray polarization film (SQ-1852AP by Sumitomo Chemical) was pasted, after anti-glare and anti-reflection treatment, as a polarization film 10 in a manner such that the direction of the absorption axis or transmission axis would make an angle to be described later.

Here, the lower substrate 19 need not necessarily be transparent.

Figure 2:
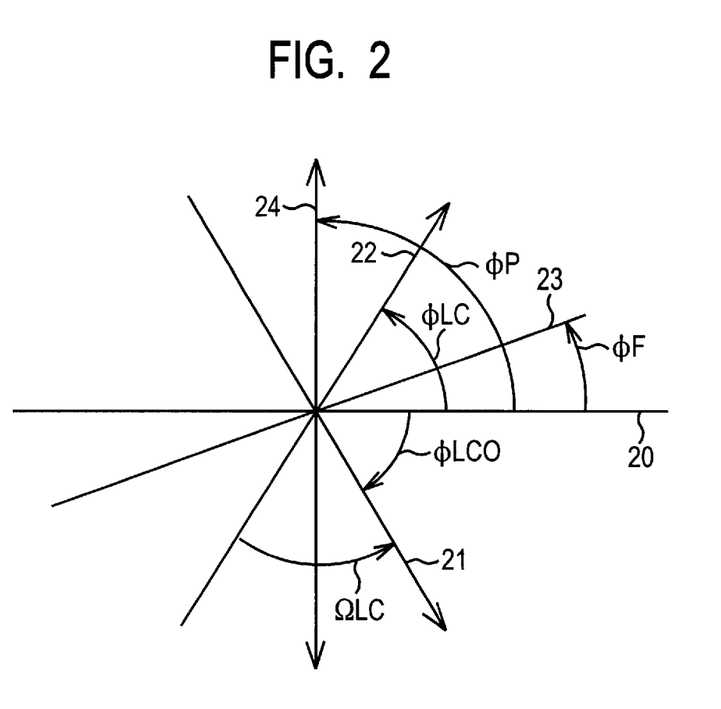
FIG. 2 is a diagram to illustrate optical configuration of the reflective liquid crystal display device of FIG. 1.

Now, FIG. 2 is a plan view to illustrate optical configuration of this reflective liquid crystal display device. Numerals 21, 22, 23, 24, and 20 show, respectively, the direction of alignment of the liquid crystal molecules closest to the lower substrate, namely, rubbing direction of the lower substrate; the direction of alignment of the liquid crystal molecules closest to the upper transparent substrate, namely, rubbing direction of the upper substrate; the direction of slow axis of the phase plate; the direction of the absorption axis of the upper polarization film: and a reference line assumed on the plane of a substrate. While the reference line 20 may be arbitrarily chosen, here it is chosen along a line that equally divides the rubbing directions 21 and 22 for convenience. Also, $\Phi_{LC0}$, $\Phi_{LC}$, and $\Phi_P$ represent angles from the reference line 20 of the alignment direction 21 of the liquid crystal molecules closest to the lower substrate 19, alignment direction 22 of the liquid crystal molecules closest to the upper transparent substrate 13, direction of the slow axis 23 of the phase plate 11, and direction 24 of the absorption axis or transmission axis of polarization film 10, respectively. Here, the twisting direction of liquid crystal (direction of twisting of liquid crystal molecules from the upper transparent substrate toward the lower substrate) as represented by $\Omega_{LC}$ is defined to be positive direction of angle. As $\Phi_F$ and $\Phi_P$ do not have directional polarity, they are defined in a range of 0° to 180°. As taking $\Phi_P$ in the direction of absorption of the polarization film is optically equivalent to taking it in the direction of transmission, either direction may be taken.

This reflective liquid crystal display device operates as a so-called normally-white mode in which it produces white display with the highest reflectivity when a voltage is not applied. As the applied voltage is increased, the reflectivity decreases and produces black display with the lowest reflectivity when an on-voltage is applied.

The phase plate used in this exemplary embodiment is of uniaxial type with positive anisotropy of refractive index and its optical axis (slow axis) is parallel to the plane of the phase plate. The retardation $R_F$, which represents the phase difference between ordinary light and extraordinary light, can be expressed as:

$$R_F = (nx - ny) \cdot d_F,$$

where nx is the refractive index (of extraordinary light) in the direction of the slow axis, ny is the refractive index (of ordinary light) in the direction of fast axis, and dF is the thickness of the phase plate. Also, the retardation of the liquid crystal layer when a sufficient voltage is applied to the liquid crystal layer and the liquid crystal molecules are ideally aligned in the direction perpendicular to the substrates is expressed by $\Delta n_{LC} \cdot d_{LC}$.

Now, a description will be given below on optical properties this liquid crystal display device with its optical configuration changed in various ways.

First, samples were fabricated by changing the magnitude of birefringence of the liquid crystal used and the thickness of the liquid crystal layer while setting the aligning condition of the liquid crystal layer and optical configuration of the phase plate and the polarization film at:

$$\Phi_{LC0}=-67.5°, \Phi_{LC}=67.5°, \Omega_{LC}=45.0°, \Phi_F=33.0°, \text{ and } \Phi_P=96.0°$$

and further changing $\Delta n_{LC} \cdot d_{LC}$ while keeping the difference of retardation $\Delta R = R_F - n_{LC} \cdot d_{LC}$ always at −0.10 micrometer. Then optical properties of these samples were measured in the reflective mode. As a result, it was found that a normally-white mode reflective liquid crystal display device capable of displaying a low-reflectivity achromatic black and high-reflectivity achromatic white could be obtained in the range of $\Delta n_{LC} \cdot d_{LC}$ of 0.20 micrometers to 0.30 micrometer. This is attributable to the difference of birefringence which is large enough to obtain white and black and to the fact that it is in the range in which coloring due to birefringence of the liquid crystal can be compensated by the phase plate.

In the above example, the difference of retardation $\Delta R$ was kept at −0.1 micrometer at all times in order to fix an experimental condition. It was confirmed that, when $\Delta R$ was in the range −0.20 micrometer to −0.05 micrometer, the color of display changed within a practically achromatic range as a voltage was applied from white display to black display. This can be attributable to being able to eliminate coloring due to birefringence of the liquid crystal layer during the shift from white to black, especially at the time of black display by applying an on-voltage by keeping $\Delta R$ within the range of −0.20 micrometer to −0.05 micrometer and keeping $\Phi_F - \Phi_{LC}$ in the range of −40° to −25° (−32.5°+/−7.5°). With this, a high-contrast reflective liquid crystal display device has been realized which is capable of low-reflectivity achromatic black display and high-reflectivity achromatic white display.

Next, from a study of characteristic by changing twist angle $\omega_L$ of the liquid crystal, it was found that a superior characteristic could be obtained in the range of twist angle of 0° to 90° in the first exemplary embodiment of the present invention. An especially superior characteristic was obtained when the twist angle $\Omega_{LC}$ was in the range 30° to 65°.

It was also confirmed that when $R_F$ was in the range 0.10 micrometer to 0.30 micrometer, specifically the reflectivity of black at the time an on-voltage was applied could be lowered.

Also, when the angle $\Phi_P - \Phi_F$ between the direction $\Phi_P$ of the absorption axis of the polarization film and the direction $\Phi_F$ of the slow axis of the phase plate was set at 45°, although polarization conversion of the linearly polarized light that had passed the polarization film showed a maximum, when a device was used at this condition, the component near the wavelength (550 nm) of the highest visibility increased, causing shift of the color of the transmitted light toward yellow when displaying white and toward blue, being complementary color of yellow, when displaying black. It was experimentally confirmed that, when making both white display and black display achromatic at the same time, it was effective to shift the center wavelength of the polarization conversion toward shorter wavelength side by setting the angle $\Phi_P - \Phi_F$ within the range 50° to 80° (65°+/−15°).

Here, specifically, results of measurement of optical characteristic at $\Delta n_{LC}^{TM} d_{LC}=0.270$ micrometer, $R_F=0.170$ micrometer, $\Phi_{LC0}=67.5°$, $\Phi_{LC}=67.5°$, $\Omega_{LC}=45.0°$, $\Phi_F 33.0°$, and $\Phi_P=96.0°$ will be shown. Under these conditions, $\Delta R = R_F - \Delta n_{LC} \cdot d_{LC} = -0.100$ micrometer, $\Phi_F - \Phi_{LC} = -34.5°$, and $\Phi_P - \Phi_F = +63.0°$, indicating that the above confirmed conditions are being satisfied.

Figure 3:
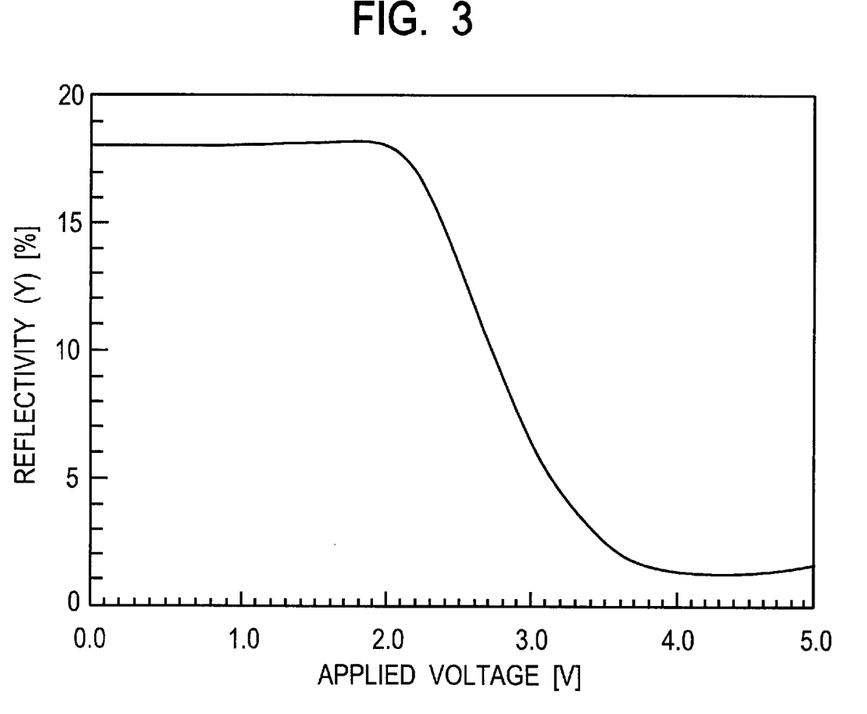
FIG. 3 is an example of reflectivity vs. applied voltage plot of the reflective liquid display device of FIG. 1.

FIG. 3 is a characteristic curve illustrating the relationship between the reflectivity and applied voltage of the reflective liquid crystal display device under these conditions. Here, the reflectivity is expressed in terms of Y-value in the XYZ system of color representation as obtained by converting the brightness of white displayed on the liquid crystal display device relative to the reflectivity of a standard white panel being defined as 100%.

As shown in FIG. 3, the reflectivity in the normal direction (direction normal to the display surface) was 18.2% and contrast was 15.8. Also, as the display changed achromatically from black to white, it was confirmed that 64-shade full-color display was possible.

Also, a reflective liquid crystal display device fabricated without use of the color filter layer 14 included in the configuration described above gave contrast of 15.3 and reflectivity of 34.9% in the normal direction.

Also, in the above configuration, the scattering film layer 12 was disposed in between the phase plate 11 and the upper transparent substrate 13; however, similar characteristic was obtained when the scattering film layer 12 was disposed on top of the polarization film 10 and when disposed between the polarization film 10 and the phase plate 11.

In this exemplary embodiment, although polycarbonate was used as the phase plate, the effect of the present invention is not limited to that material. It was confirmed that similar effect could be obtained by using polyarylate or polysulfone, for example.

Also, although an aluminum-containing metal reflection electrode is used as the reflective electrode in this exemplary embodiment, the effect of the present invention is not limited to it; similar effect can be obtained by using a silver-containing metal reflection electrode, for example.

Second Exemplary Embodiment

Figure 4:
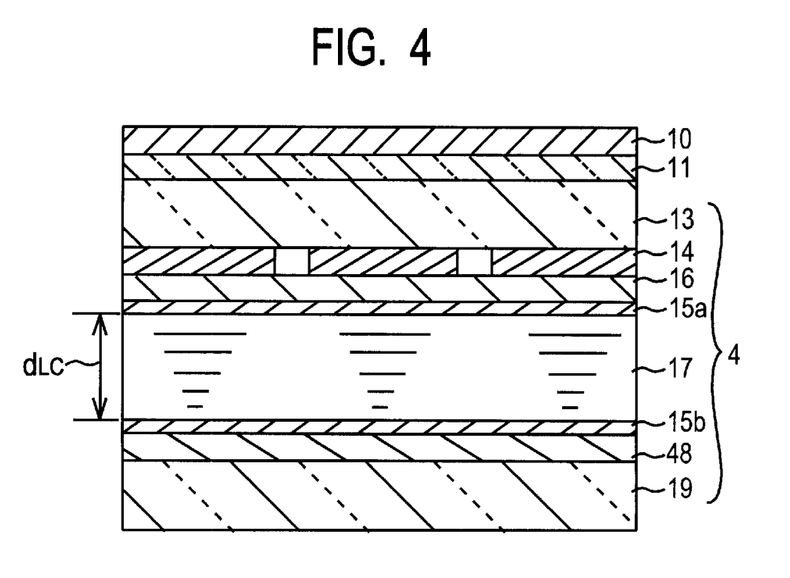
FIG. 4 is a cross-sectional view of the schematic structure of a reflective liquid crystal display device in a second exemplary embodiment of the present invention.

FIG. 4 is a cross-sectional view of schematic construction of a reflective liquid crystal display device in a second exemplary embodiment of the present invention. The components having the same function as in FIG. 1 are represented by the same numerals. What is different from the first exemplary embodiment is that a diffuse-reflection type metal reflecting electrode 48 is employed in place of the specular reflection type metal reflecting electrode 18. A diffuse (scattering) type metal reflecting electrode was fabricated by vapor deposition of 200 nm of aluminum on top of 300 nm of titanium vapor deposited on a lower substrate 19, followed by roughening of the surface to an average angle of inclination of 3 to 12°. Description of other part of the fabrication process of the liquid crystal cell will be omitted as it is the same as in the first exemplary embodiment.

Optical configuration of the second exemplary embodiment is the same as the first exemplary embodiment illustrated in FIG. 2.

Samples were fabricated by changing the magnitude of birefringence of the liquid crystal used and the thickness of the liquid crystal layer while setting the aligning condition of the liquid crystal layer, and optical configuration of the phase plate and the polarization film at:

$$\Phi_{LC0}=-67.5°, \Phi_{LC}=67.5°, \Omega_{LC}=45.0°, \Phi_F=33.0°, \text{ and } \Phi_P=96.0°$$

and further changing $\Delta n_{LC} \cdot d_{LC}$ while keeping the difference of retardation $\Delta R = R_F - \Delta n_{LC} \cdot d_{LC}$ always at −0.10 micrometer. Then optical properties of these samples were measured at reflective mode.

As a result, a normally-white mode reflective liquid crystal display device capable of displaying a low-reflectivity achromatic black and high-reflectivity achromatic white was obtained in the range of $\Delta n_{LC} \cdot d_{LC}$ of 0.20 micrometer to 0.30 micrometer. This is attributable to the difference of birefringence large enough to obtain white and black and to the fact that it is in the range in which the coloring due to birefringence of the liquid crystal can be compensated by the phase plate.

Also, it was confirmed that, when ΔR was in the range −0.20 micrometer to −0.05 micrometer, the color of display changed within a practically achromatic range as a voltage was applied from white display to black display. This can be attributable to being able to eliminate coloring due to birefringence of the liquid crystal layer during the shift from white to black, especially at the time of black display by applying an on-voltage by maintaining ΔR within the range of ΔR of −0.20 micrometer to −0.05 micrometer and the range of $\Phi_P$-$\Phi_{LC}$ of −40° to −25° (−32.5°+/−7.5°). With this, a high-contrast reflective liquid crystal display device has been realized which is capable of low-reflectivity achromatic black display and high-reflectivity achromatic white display.

Next, from a study of characteristic by changing the twist angle $\Omega_{LC}$ of the liquid crystal, it was found that a superior characteristic could be obtained in the range of twist angle of 0° to 90° in the second exemplary embodiment of the present invention. An especially superior characteristic was obtained when the twist angle $\Omega_{LC}$ was in the range 30° to 65°.

It was also confirmed that when $R_F$ was in the range 0.10 micrometer to 0.30 micrometer, the black reflectivity at the time an on-voltage was applied could be lowered.

Also, it was confirmed that the display could be made achromatic by controlling coloring in white display and black display by setting the angle $\Phi_P$-$\Phi_F$ between the direction $\Phi_P$ of the absorption axis of the polarization film and the direction $\Phi_F$ of the slow axis of the phase plate to within 50° to 80° (65°+/−15°).

Here, specifically, results of measurement of optical characteristic at $\Delta n_{LC} \cdot d_{LC}$=0.270 micrometer, $R_F$=0.170 micrometer, $\Phi_{LC0}$=−67.5°, $\Phi_{LC}$=67.5°, $\Omega_{LC}$=45.0°, $\Phi_F$=33.0°, and $\Phi_P$=96.0° will be shown. Under these conditions, $\Delta R = R_F - \Delta n_{LC} \cdot d_{LC}$=−0.10 micrometer, $\Phi_F$-$\Phi_{LC}$=−34.5°, and $\Phi_P$-$\Phi_F$=−63.0° indicating that the above confirmed conditions are being satisfied.

The reflectivity in the normal direction was 17.1% and contrast was 15.4. Also, as the display changed achromatically from black to white, it was confirmed that 64-shade full-color display was possible.

Also, a reflective liquid crystal display device fabricated without use of the color filter layer 14 included in the configuration described above gave contrast of 15.1 and reflectivity of 33.4% in the normal direction.

In this exemplary embodiment, although polycarbonate was used as the phase plate, the effect of the present invention is not limited to that material. It was confirmed that similar effect could be obtained by using polyarylate or polysulfone, for example.

Also, although aluminum-containing metal reflection electrode was used as the reflective electrode in this exemplary embodiment, the effect of the present invention is not limited to it; similar effect can be obtained by using silver-containing metal reflection electrode, for example.

Third Exemplary Embodiment

The construction and method of fabrication of a liquid crystal display device in a third exemplary embodiment are common with those of the first exemplary embodiment; the display device has a cross-section of the reflective liquid crystal display device as illustrated in FIG. 1 and optical configuration similar to the reflective liquid crystal display device as illustrated in FIG. 2.

In this exemplary embodiment, the angle $\Phi_F$ of the phase lagging axis of the phase plate is set at a value different from the preceding exemplary embodiments. Namely, in the first and second exemplary embodiments, a desirable result was obtained by setting $\Phi_F$-$\Phi_{LC}$ at a value in the range −40° to −25° (−32.5°+/−7.5°). However, in this exemplary embodiment, similar desirable result is obtainable by setting $\Phi_F$-$\Phi_{LC}$ at a value in the range +65° to +105° (+85°+/−20°).

Samples were fabricated by changing the magnitude of birefringence of the liquid crystal used and the thickness of the liquid crystal layer while setting the aligning condition of the liquid crystal layer, and optical configuration of the phase plate and the polarization film at:

$$\Phi_{LC0}=-67.5°, \Phi_{LC}=67.5°, \Omega_{LC}=45.0°, \Phi_F=155.0°, \text{ and } \Phi_P=90.0°$$

and further changing $\Delta n_{LC} \cdot d_{LC}$ while keeping the difference of retardation $\Delta R = R_F - \Delta n_{LC} \cdot d_{LC}$ always at −0.10 micrometer. Then optical properties of these samples were measured at reflective mode. As a result, a normally-white mode reflective liquid crystal display device capable of displaying a low-reflectivity achromatic black and high-reflectivity achromatic white was obtained in this exemplary embodiment, too, in the range of $\Delta n_{LC} \cdot d_{LC}$ of 0.20 micrometer to 0.30 micrometer.

Also, it was confirmed that, when ΔR was in the range −0.20 micrometer to −0.05 micrometer, the color of display changed within a practically achromatic range as a voltage was applied from white display to black display. This can be attributable to being able to eliminate coloring due to birefringence of the liquid crystal layer during the shift from white to black, especially at the time of black display by applying an on-voltage by keeping ΔR within the range of −0.20 micrometer to −0.05 micrometer and keeping $\Phi_F$-$\Phi_{LC}$ in the range of +65° to +105° (+85°+/−20°). With this, a high-contrast reflective liquid crystal display device has been realized which is capable of displaying low-reflectivity achromatic black and high-reflectivity achromatic white.

Next, from a study of characteristic by changing the twist angle $\Omega_{LC}$ of the liquid crystal, it was found that a superior characteristic could be obtained in the range of twist angle of 0° to 90° in the third exemplary embodiment of the present invention. An especially superior characteristic was obtained when the twist angle WLC was in the range 30° to 65°.

It was also confirmed that when $R_F$ was in the range 0.10 micrometer to 0.30 micrometer, the reflectivity of black at the time an on-voltage was applied could be lowered.

Also, it was confirmed that the display could be made achromatic by controlling coloring in white display and black display by setting the angle $\Phi_P$-$\Phi_F$ between the direction $\Phi_P$ of the absorption axis of the polarization film and the direction $\Phi_F$ of the slow axis of the phase plate to within −60° to −90° (−75°+/−15°).

Here, specifically, results of measurement of optical properties at $\Delta n_{LC} \cdot d_{LC}$=0.270 micrometer, $R_F$=0.170 micrometer, $\Phi_{LC0}$=−67.5°, $\Phi_{LC}$=67.5°, $\Omega_{LC}$=45.0°, $\Phi_F$=155.0°, and $\Phi_P$=90.0° will be shown. Under these conditions, $\Delta R = R_F - \Delta n_{LC} \cdot d_{LC}$=−0.10 micrometer, $\Phi_F$-$\Phi_{LC}$=−87.5°, and $\Phi_P$-$\Phi_F$=−65.0° indicating that the above confirmed conditions are being satisfied.

Figure 5:
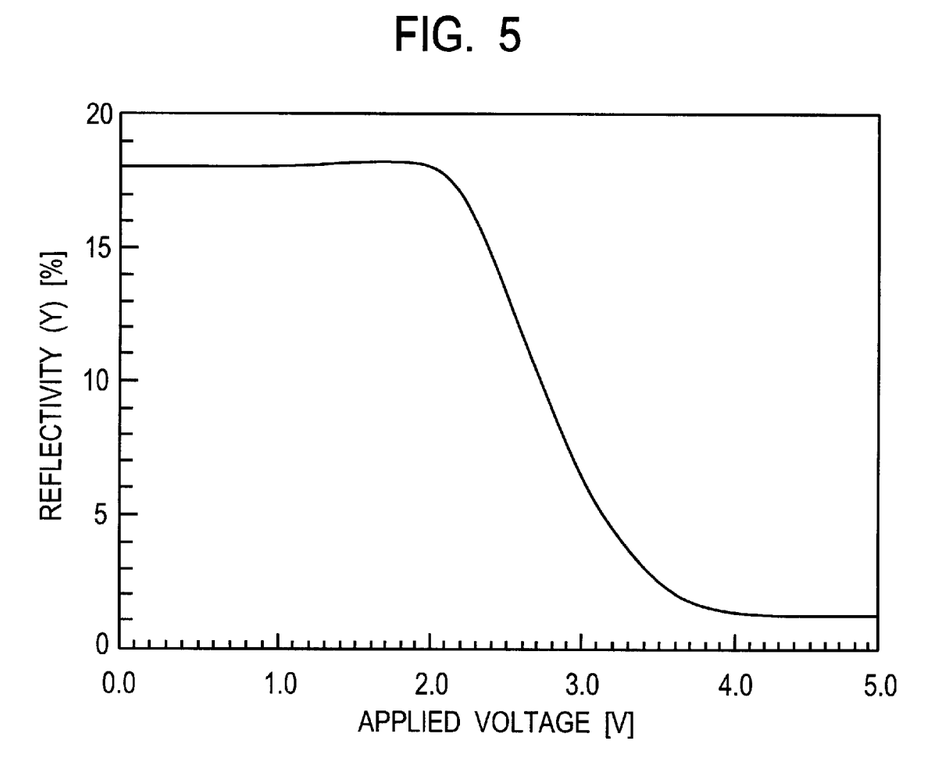
FIG. 5 is an example of reflectivity vs. applied voltage plot of a reflective liquid display device in a third exemplary embodiment of the present invention.

FIG. 5 is a characteristic curve illustrating the relationship between the reflectivity and applied voltage of the reflective liquid crystal display device of the third exemplary embodiment. The reflectivity in the normal direction was 18.1% and contrast was 15.6. Also, as the display changed achromatically from black to white, it was confirmed that 64-shade full-color display was possible.

Also, a reflective liquid crystal display device fabricated without use of the color filter layer 14 included in the configuration described above gave contrast of 15.1 and reflectivity of 34.3% in the normal direction.

In the above configuration, the scattering film layer 12 was disposed in between the phase plate 11 and the upper transparent substrate 13; however, similar characteristic was obtained when the scattering film layer 12 was disposed on top of the polarization film 10 and when disposed between the polarization film 10 and the phase plate 11.

In this exemplary embodiment, although polycarbonate was used as the phase plate, the effect of the present invention is not limited to that material. It was confirmed that similar effect could be obtained by using polyarylate or polysulfone, for example.

Also, although an aluminum-containing metal reflection electrode was used as the reflective electrode in this exemplary embodiment, the effect of the present invention is not limited to it; similar effect can be obtained by using a silver-containing metal reflection electrode, for example.

Fourth Exemplary Embodiment

The method of fabrication and construction of the reflective liquid crystal display device in a fourth exemplary embodiment are basically the same as those of the first exemplary embodiment and the device has a cross-section of the reflective liquid crystal display device as illustrated in FIG. 1 and optical configuration similar to the reflective liquid crystal display device as illustrated in FIG. 2.

What is different is that a material having biaxial optical anisotropy is used as the phase plate 11. Assuming that the direction of the normal to the phase plate is z-axis, that of the slow axis on the plane of the phase plate is x-axis, that of the fast axis is y-axis, and indices of refraction in these directions are nz, nx, and ny, respectively, we introduce a z-coefficient Qz which is defined by:

$$Qz=(nx-nz)/(nx-ny).$$

The z-coefficient Qz is an index representing the magnitude of optical anisotropy in the direction of z-axis of the phase plate.

The case of QZ=1 corresponds to uniaxial optical anisotropy. When the angle of light incident on the liquid crystal display device deviates from the direction of the normal, retardation experienced by the light changes causing viewing angle dependence. Therefore, in this exemplary embodiment, a phase plate having biaxial optical anisotropy is used to reduce viewing angle dependence by compensating the change of retardation.

In this exemplary embodiment, through a study by changing Z-coefficient QZ of the phase plate 11 under the conditions of $\Delta n_{LC} \cdot d_{LC}=0.270$ micrometer, $R_F=0.170$ micrometer, $\Phi_{LC0}=-67.5°$, $\Phi_{LC}=67.5°$, $\Omega_{LC}=45°$, $\Phi_P=33.0°$, and $\Phi_F=96.0°$, it was found that there was little influence on the reflectivity of a change in the viewing angle and an excellent characteristic was obtainable when QZ was in the range 1.0 to 3.0.

Figure 6A:
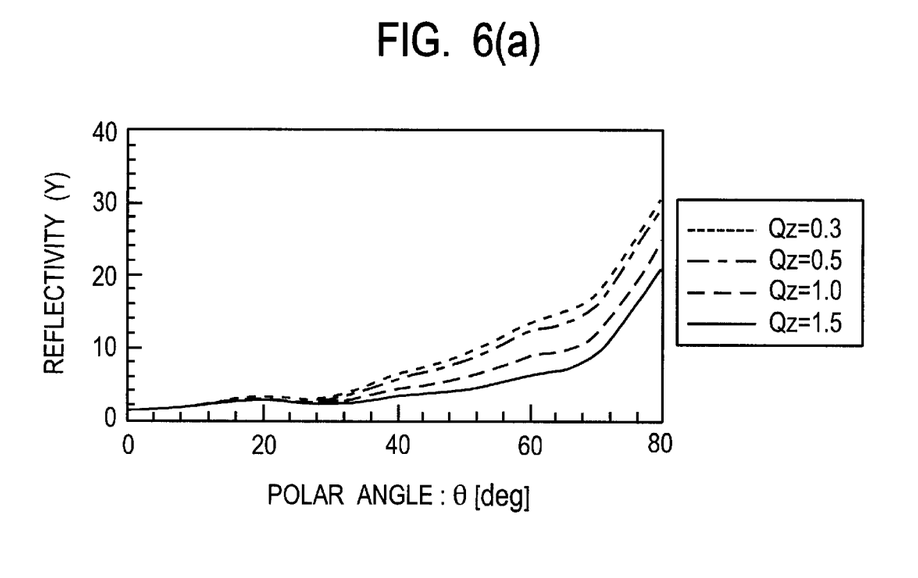
Figure 6B:
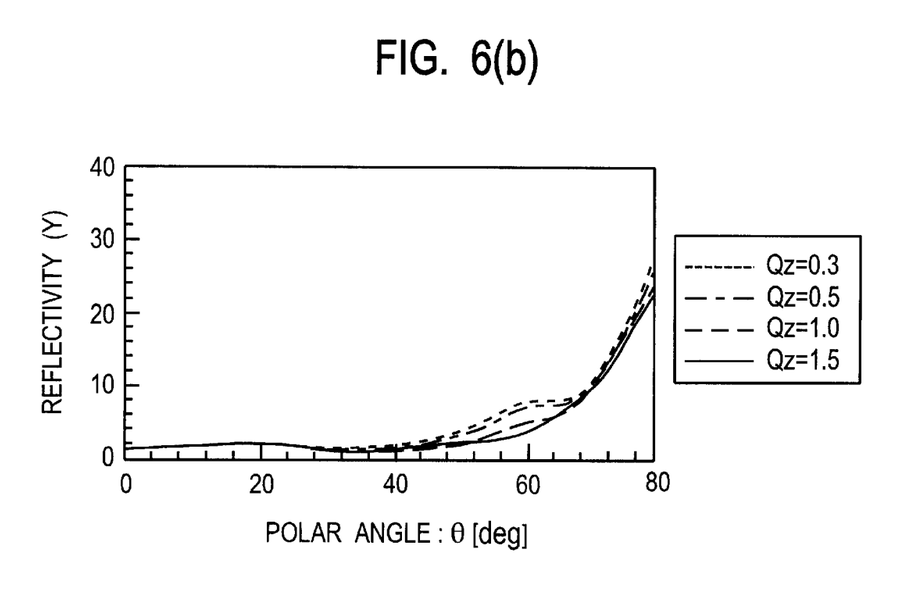

Next, the change of black reflectivity with the viewing angle was studied in detail for Qz values of 0.3, 0.5, 1.0, and 1.5. FIG. 6(a) shows black reflectivity at the time an on-voltage is applied as a viewing angle is tilted from the normal direction to rightward direction (rightward direction along the reference line 20 in FIG. 2) of a display device in this exemplary embodiment. FIG. 6(b) shows black reflectivity at the time an on-voltage is applied as a viewing angle is tilted from the normal direction to upward direction (upward direction perpendicular to the reference line 20 in FIG. 2).

Comparing FIG. 6(a) and FIG. 6(b), one can recognize that the phase plate 11 has influence on the viewing angle characteristic and that a superior black reflectivity characteristic with little viewing angle dependence is obtained when QZ is large. Based on this result, it was confirmed that a more desirable viewing angle characteristic is obtainable when QZ is in the range 1.0 to 2.0.

In this example, a phase plate having optical anisotropy along two axes was used. Instead, a uniaxial phase plate having positive anisotropy with the optical axis in the direction of the x-axis and a uniaxial phase plate having negative optical anisotropy with the optical axis in the direction of the z-axis may be used in combination. In this case, too, an excellent viewing angle characteristic is obtainable when QZ of the combined phase plates is in the range 1.0 to 3.0.

Fifth Exemplary Embodiment

Figure 7:
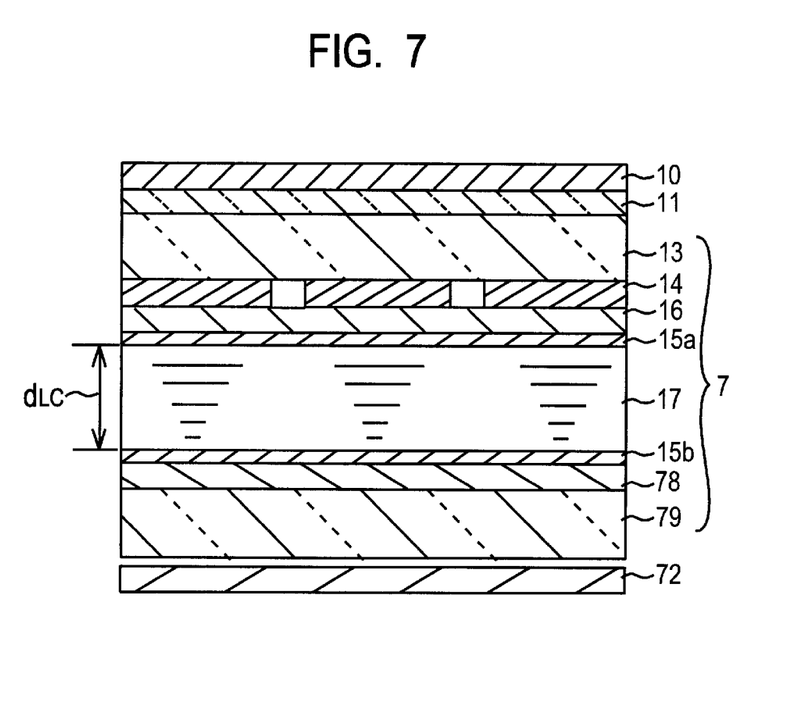
FIG. 7 is a cross-sectional view of the schematic structure of a reflective liquid crystal display device in a fifth exemplary embodiment of the present invention.

FIG. 7 is a cross-sectional view illustrating schematic structure of a reflective liquid crystal display device in a fifth exemplary embodiment. The components having the same function as in FIG. 1 or FIG. 4 that illustrate preceding exemplary embodiments are represented by the same numerals. The structure of this exemplary embodiment differs from the second exemplary embodiment in that the lower electrode has been changed from a diffuse reflection type metal reflection electrode to an ITO-based transparent electrode 78, the lower substrate has been changed to a transparent substrate 79, and a silver-based diffuse reflector 72 is disposed on its outside. Other structural components are the same as in the second exemplary embodiment.

The optical configuration of the reflective liquid crystal display device is the same as in FIG. 2.

In this exemplary embodiment, optical configuration was set at $\Delta n_{LC} \cdot d_{LC}=0.270$ micrometer, $R_F=0.170$ micrometer, $\Phi_{LC0}=-67.5°$, $\Phi_{LC}=67.5°$, $\Omega_{LC}=45°$, $\Phi_P=33.0°$, and $\Phi_F=96.0°$.

When transparent substrates and transparent electrodes were used as the upper and lower substrates, and a diffuse reflector was used on the lower side, some image blurring due to parallax was observed; but it was confirmed that a reflective liquid crystal display device in which the change of viewing angle characteristic was natural could be obtained.

Measurement of the front characteristic provided reflectivity of 16.1% and contrast of 14.3.

Also, a reflective liquid crystal display device fabricated without use of the color filter layer 74 included in the above configuration provided reflectivity of 32.1% and contrast of 14.0 in the normal direction.

It was also confirmed that, when installing a diffuse reflector 72 underneath the lower transparent plate 79 by putting an air layer in between without completely bonding them with an adhesive, more natural viewing angle characteristic could be obtained by the expansion of the diffusion effect due to the difference between the refractive index of resin of approximately 1.6 and the refractive index of air of 1.0.

In this exemplary embodiment, although silver was used as the diffuse reflector, it was confirmed that similar inventive effect could be obtained by using an aluminum diffuse reflector.

Sixth Exemplary Embodiment

Figure 8:
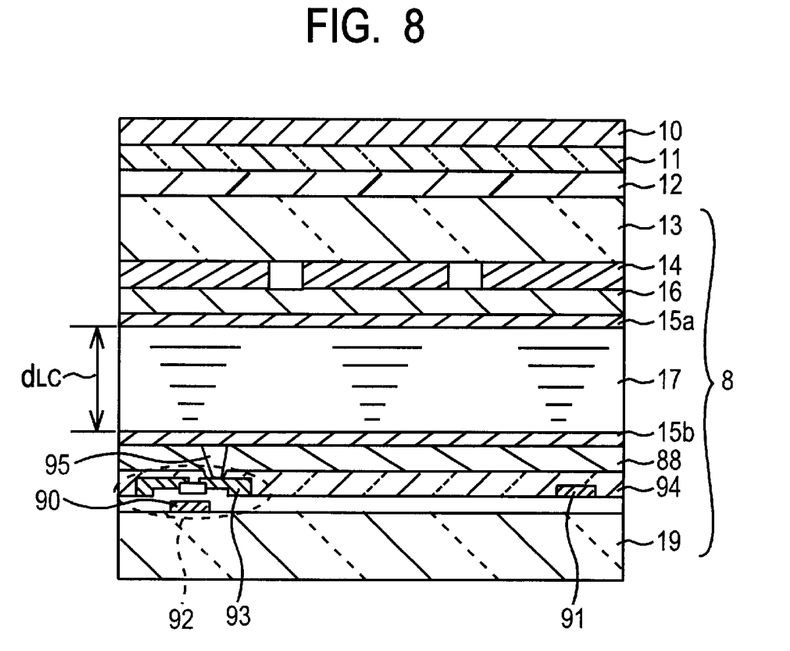
FIG. 8 is a cross-sectional view of the schematic structure of a reflective liquid crystal display device in a sixth exemplary embodiment of the present invention.

FIG. 8 is a cross-sectional view illustrating schematic structure of a reflective liquid crystal display device in a sixth exemplary embodiment. The components having the same function as in FIG. 1 or FIG. 4 that illustrates preceding exemplary embodiments are represented by the same numerals.

In this exemplary embodiment, a so-called active matrix array is configured in which a gate electrode 90, a source electrode 91, a thin-film transistor (TFT) 92, a drain electrode 93, a flattening film 94, etc., are disposed on a lower substrate 19. A metal reflection electrode 88 is electrically continuous with the non-linear switching device (TFT) 92 underneath the flattening film 94 via a contact hole 95. As the metal reflection electrode 88 is of pixel-by-pixel isolated construction to allow active driving of each pixel, high-contrast display is obtainable.

The representation of the optical layout of the reflective liquid crystal display device of this exemplary embodiment is the same as in FIG. 2.

Using a non-alkaline glass substrate (for example, 1737 by Corning, Inc.) as an upper transparent substrate 13 and a lower substrate 19, a pigment suspension type color filter comprising stripes of red, green, and blue was formed by photolithography on the upper transparent substrate 13 as a color filter layer 14, and, on top of it, a pixel electrode was formed with indium tin oxide as a transparent electrode 16.

Also, a gate electrode 90 made of aluminum and tantalum, and a source electrode 91 and a drain electrode 93 made of titanium and aluminum, were disposed on the lower substrate 19 by a predetermined method. At each intersection of the gate electrode 90 and the source electrode 91, the TFT device 92 made of amorphous silicon was formed.

After forming the flattening film 94 over the entire surface of the lower substrate 19 on which a nonlinear device has been formed by coating positive type photosensitive acrylic resin (for example, FVR by Fuji Yakuhin), the contact hole 95 was formed on the drain electrode 93 by UV irradiation using a predetermined mask. On top of the contact hole 95 thus formed, a specular reflection type metal reflection electrode 88 was formed by vacuum deposition of 200 nm of aluminum after vacuum deposition of 300 nm of titanium.

Alignment layers 15a and 15b were formed on the transparent electrode 16 and the metal reflection electrode 88, respectively, by printing 5% by weight γ-butyrolactone solution of polyimide, curing at 250° C., followed by aligning process by rotation rubbing using rayon cloth to obtain a predetermined twist angle.

Subsequently, thermosetting sealing resin (for example STRUCTOBOND® by Mitsui Toatsu Chemical) mixed with 1.0% by weight of glass fibers of a predetermined diameter is printed on the peripheral region of the upper transparent substrate 13. Resin beads of a predetermined diameter were sprinkled at a density of 100–200 pieces/mm2 on the lower substrate 19, the upper transparent substrate 13 and the lower substrate 19 were put together, and the sealing resin was cured at 150° C. Subsequently, liquid crystal prepared by mixing a predetermined quantity of chiral liquid crystal into fluorine ester type nematic liquid crystal with$\Delta nLC$=0.09 was vacuum injected, sealed with UV cured resin, and then cured with UV light.

An isotropic front scattering film was pasted as a scattering film layer 12 on the upper transparent substrate 13 of the liquid crystal cell thus formed, and, on top of it, polycarbonate was pasted as a phase plate 11 in a manner such that its slow axis would make an angle to be described later; furthermore, as a polarization film 10, a neutral gray polarization film (SQ-1852AP by Sumitomo Chemical) was pasted after anti-glare (AG) and anti-reflection (AR) treatment in a manner such that the direction of the absorption axis or transmission axis would make an angle to be described later.

Optical configuration of this exemplary embodiment was set at $\Delta nLC \cdot dLC$=0.270 micrometer, $R_F$=0.170 micrometer, $\Phi_{LC0}$=−67.5°, $\Phi_{LC}$=67.5°, $\Omega_{LC}$=45.0°, $\Phi_F$=33.0°, and $\Phi_P$96.0°, which is the same as that of the first exemplary embodiment.

With this, full-color display with 64 shades was obtained. As an aperture ratio of 97% was obtained by forming a metal reflection electrode on a flattening film, the reflectivity was 17.9% and the contrast was 15.9 in the normal direction By forming a nonlinear device such as a TFT on the lower substrate not only in this exemplary embodiment but also in all the previously described exemplary embodiments, an actively driven reflective liquid crystal display device is obtainable in accordance with the method of this exemplary embodiment. Similar effect can also be obtained by using not only an amorphous silicon TFT but also a two-terminal device (such as MIM and thin film diode) or a polysilicon TFT as the nonlinear device.

INDUSTRIAL APPLICATION

As has been described above, a bright, high-contrast, normally-white reflective liquid crystal display device which is capable of making an achromatic change from white to black is obtainable with the present invention. Furthermore, a reflective liquid crystal display device which is capable of multi-shade color display is also obtainable by using a color filter. As a result, it becomes possible to supply a high picture-quality liquid crystal display device with exceedingly low power dissipation, and utilization of liquid crystal display devices will be promoted in a wide area of applications including mobile information devices.

What is claimed is:

1. A reflective liquid crystal display device comprising:
    a liquid crystal cell wherein nematic liquid crystal is sealed in between a pair of substrates;
    a polarization film located on one of the substrates of said liquid crystal cell;
    a phase plate located between said polarization film and said liquid crystal cell; and
    optical reflection means located on the side of the other substrate; wherein
        the twist angle of the nematic liquid crystal between said pair of substrates is in the range of 0° to 90°;
        the product $\Delta n_{LC} \, d_{LC}$ of the index of birefringence $\Delta n_{LC}$ of said nematic liquid crystal and the thickness $d_{LC}$ of the liquid crystal layer is in the range of 0.20 to 0.30 micrometers;
        the relations of the direction of the major axis $\Phi_{LC}$ of the liquid crystal molecule closest to said one of the substrates, the direction $\Phi_F$ of the phase lagging axis of said phase plate, and the direction $\Phi_P$ of the absorption axis or transmission axis of said polarization film are such that $\Phi_F$-$\Phi_{LC}$ is in the range of −40° to −25°, $\Phi_P$-$\Phi_F$ is in the range of −50° to +80°, or $\Phi_F$-$\Phi_{LC}$ is in the range of +65° to +105°, $\Phi_P$-$\Phi_F$ is in the range of −60° to −90°; and
        the difference of indices of birefringence $\Delta R$ as defined by $R_F$-$\Delta n_{LC} \, d_{LC}$ using said product $\Delta n_{LC} \, d_{LC}$ and retardation $R_F$ of said phase plate is in the range of −0.20 micrometers to −0.05 micrometers.

2. The reflective liquid crystal display device of claim 1, wherein said twist angle of said nematic liquid crystal is in the range of 30° to 65°.

3. The reflective liquid crystal display device of claim 1, wherein said $R_F$ is in the range of 0.10 micrometers to 0.30 micrometers.

4. The reflective liquid crystal display device of claim 1, wherein said phase plate is made of at least one selected from the group consisting of polycarbonate, polyarylate, and polysulfone.

5. The reflective liquid crystal display device of claim 1, wherein Z-coefficient Qz of said phase plate is in the range 1.0 to 3.0, said Qz being a coefficient defined by Qz=(nx−nz)/(nx−ny) where nx (refractive index in the direction of slow axis), ny (refractive index in the direction of fast axis) and nz are refractive indices in the respective axial directions in a spatial coordinate system (x, y, z) with the normal to the plane of the plate being defined as z-axis.

6. The reflective liquid crystal display device of claim 5, wherein said Qz is in the range of 1.0 to 2.0.

7. The reflective liquid crystal display device of claim 1, wherein a scattering film is located on said one of the substrates.

8. The reflective liquid crystal display device of claim 7, wherein said scattering film is located between said phase plate and said one of the substrates.

9. The reflective liquid crystal display device of claim 7, wherein said scattering film is a front scattering film.

10. The reflective liquid crystal display device of claim 1, wherein said optical reflection means is a metal electrode including at least one metal selected from the group consisting of aluminum and silver as a component.

11. The reflective liquid crystal display device of claim 10, wherein a surface of said metal electrode is specular.

12. The reflective liquid crystal display device of claim 10, wherein a scattering film is located on said metal electrode.

13. The reflective liquid crystal display device of claim 10, wherein a surface of said metal electrode has projections and depressions with an average angle of inclination in the range of 3° to 12° and causes diffuse reflection of incident light.

14. The reflective liquid crystal display device of claim 1, wherein said the other of the substrates is a transparent substrate on the outer side of which optical reflection means is located.

15. The reflective liquid crystal display device of claim 14, wherein a layer of air intervenes between said transparent substrate and said optical reflection means.

16. The reflective liquid crystal display device of claim 1, wherein a color filter is located on the side of said one of the substrates.

17. The reflective liquid crystal display device of claim 1, wherein a nonlinear switching device is located on the side of said the other of the substrates.

18. The reflective liquid crystal display device of claim 17, wherein an insulating flattening film is formed on top of said nonlinear switching device, and said nonlinear switching device and an electrode on said the other of the substrates are electrically continuous through a contact hole formed on the flattening film.

* * * * *

UNITED STATES PATENT AND TRADEMARK OFFICE
CERTIFICATE OF CORRECTION

PATENT NO. : 6,567,149 B1
DATED : May 20, 2003
INVENTOR(S) : Hisanori Yamaguchi et al.

It is certified that error appears in the above-identified patent and that said Letters Patent is hereby corrected as shown below:

<u>Title page,</u>
After Item [75], Inventors, change "Tomaoki" to -- Tomoaki --;
After Item [30], Foreign Application Priority Data, change "1999" to -- 1998 --.
Item [57], ABSTRACT,
Line 10, after "positive" insert -- , --;
Line 17, after "to" (second occurrence) insert -- + --.

<u>Column 12,</u>
Line 61, change "-50°" to -- +50° --.

Signed and Sealed this

Seventh Day of October, 2003

JAMES E. ROGAN
*Director of the United States Patent and Trademark Office*